April 26, 1949.   W. MacWILLIAM   2,468,338
HOSE COUPLING
Filed Aug. 11, 1944                                       2 Sheets-Sheet 1
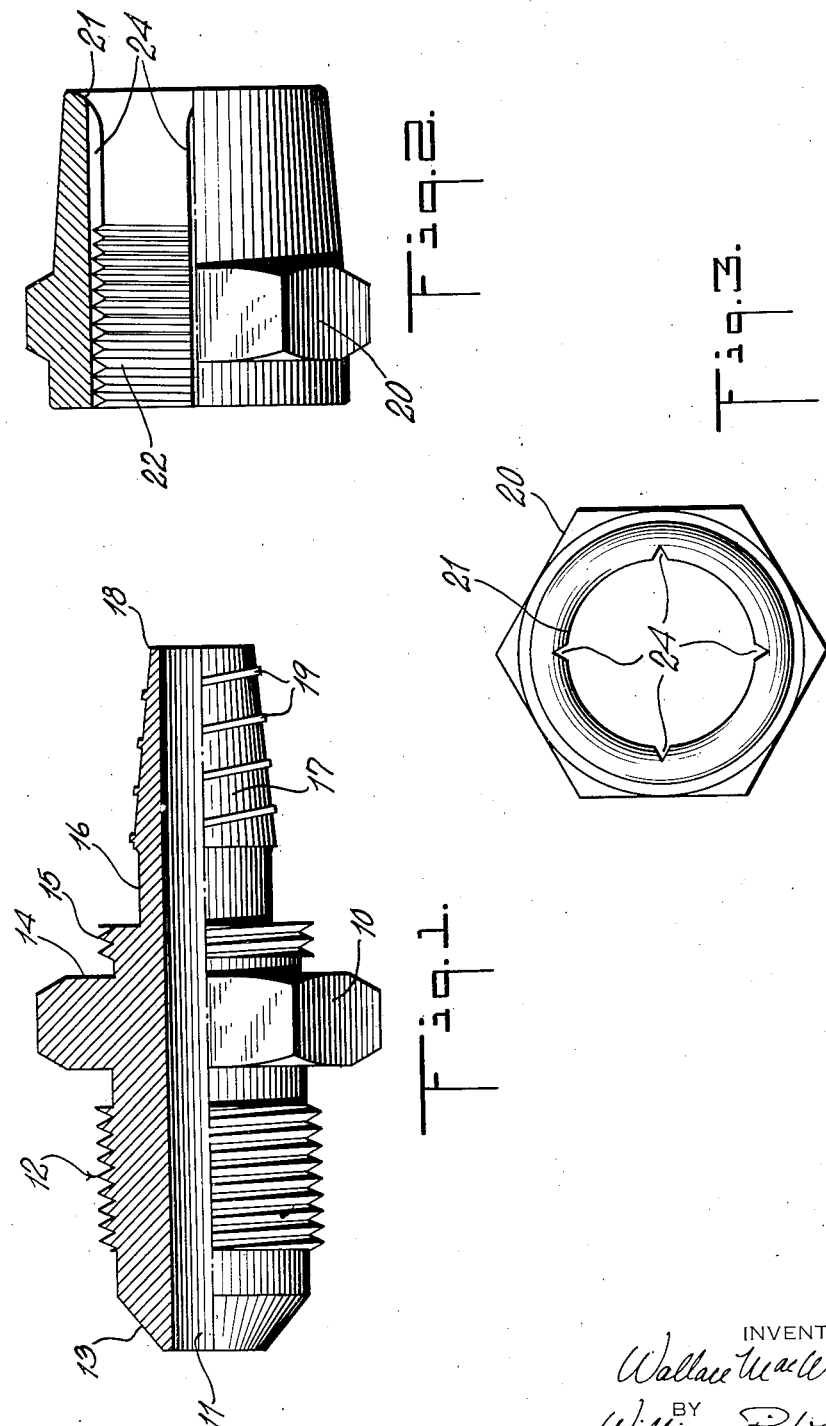
INVENTOR
Wallace MacWilliam
BY
Williams, Rich & Morse
ATTORNEYS

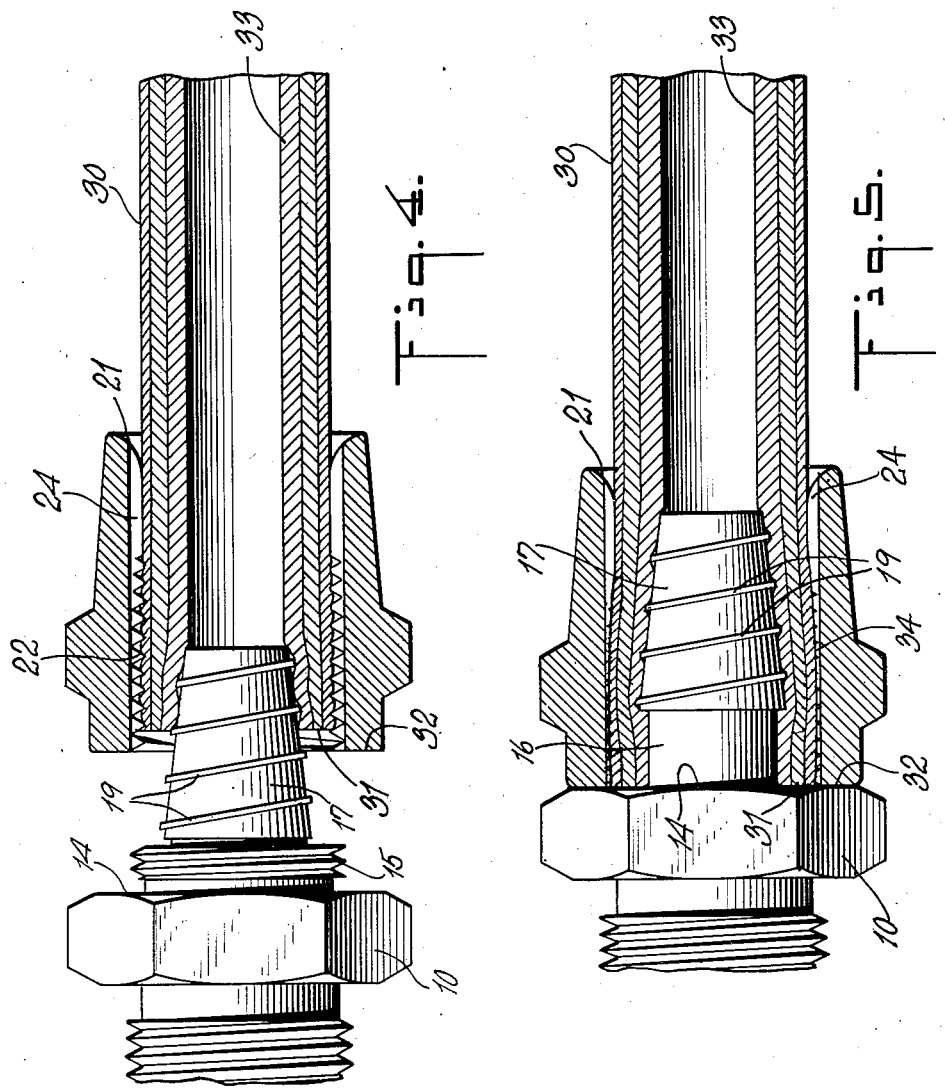

Patented Apr. 26, 1949

2,468,338

UNITED STATES PATENT OFFICE 2,468,338

HOSE COUPLING

Wallace MacWilliam, Montville, N. J., assignor to Resistoflex Corporation, Belleville, N. J., a corporation of New York Application August 11, 1944, Serial No. 548,979

1 Claim. (Cl. 285—84)

This invention relates to fittings or couplings for flexible hose, more particularly to fittings which may be quickly attached, detached and reused, without the use of any special tools.

Flexible tubing and hose are used for a variety of purposes such as gasoline, oil and hydraulic lines, instrument lines, compressed air and vacuum lines, etc. To enable and facilitate their connection to associated mechanisms they are equipped with fittings at their ends which usually have male or female threaded members for making such connections. These fittings must be leakproof and should secure the hose end in such manner that they will not blow off, or weaken the hose at the point where the coupling is applied so that it will fail, at pressures below the normal burst pressure of the hose itself, so that the full capacity of the hose to sustain pressure can be utilized.

In many applications it is desirable that a fitting be available which can be applied to a length of hose cut from bulk in the field without requiring the use of special tools. Such fittings are known in the trade as the "quick-attachable", renewable or reusable types and a variety of such fittings have been devised. Some such fittings require special tools for their use. Some are so constructed that in the process of attachment some part of the fitting is deformed so that it is not reusable. Some have parts which may be assembled backward by unskilled labor with resulting decreased efficiency. Many of such fittings which have been developed for use with rubber or synthetic rubber hose are unsuitable for use with hose made in whole or in part of various plastics which have recently come into extensive use and which have properties different from rubbers, such as less compressibility or less elasticity for example.

The objects of the present invention are to provide a "quick-attachable" fitting which is easily assembled, which cannot be assembled with any part reversed, which can easily be removed and reused, no part having been deformed in the process of attachment, which is particularly adapted for use with hose incorporating a lining of non-rubber flexible material, which will be leakproof and not weaken the hose, which has only two parts and which can be assembled on a hose end with ordinary wrenches.

Other objects and advantages will in part be obvious from and in part will appear in the course of the following description of the present preferred embodiments of the invention, taken in conjunction with the drawings in which:

Fig. 1 shows, in half section, the coupling part of a two piece fitting of the invention;

Fig. 2 is a similar view of the other part, or collar;

Fig. 3 is an end view of the collar as seen from the right of Fig. 2;

Fig. 4 shows in plan view a slightly modified form of the coupling part in the process of being inserted into a hose end enclosed in the collar of Fig. 2, the collar and hose being shown in section; and Fig. 5 shows a further modification of the coupling part fully inserted in a hose end enclosed in the collar of Fig. 2 which, together with the hose, is shown in section.

Referring to Fig. 1, the coupling part is provided with the usual hexagonal wrench-engaging portion 10 and has a straight cylindrical bore 11 of uniform diameter throughout its length. On the left side of the hexagonal portion 10 is a threaded nipple 12 with a beveled surface 13 of standard configuration for engagement with a standard flared fitting or the like (not shown). It will be understood that the nipple 12 may be replaced by any type of connector desired and that per se it does not constitute part of the invention.

The right-hand face 14 of the hexagonal portion 10 is formed as a flat surface, normal to the axis of the coupling part, against which the end of the collar of Fig. 2 abuts when the parts are assembled. Extending outwardly from the surface 14 is a short externally-threaded portion 15 following which there is a short cylindrical section 16 of reduced diameter and a shank 17 which is tapered from its junction with the cylindrical portion 16 to its entering edge 18. At the junction of the portion 16 with the tapered shank 17 there is an annular upstanding shoulder behind which the hose end contracts as illustrated in Fig. 5. This contraction behind the annular shoulder, which is due to the natural resilience of the hose aided by the close confinement of the collar, aids materially in increasing the resistance of the assembly to tension tending to pull the fitting off of the hose. The shank 17 is in the form of a truncated cone having a slight slope, for example about 4½ degrees relative to the axis. The entering edge 18 has an outer diameter slightly in excess of the inner diameter of the hose with which it is to be used and an inner diameter, which is the diameter of the bore 11, substantially the same as the normal inner diameter of the hose so as to provide a full-flow fitting. The external surface of the shank 17 is formed with a spiral thread 19 having a relatively steep pitch. The pitch, for example, in a fitting for a hose having an inner diameter of 3/16 of an inch may be about 14 threads to the inch and the depth of the thread may be about .015 inch.

Referring to Fig. 2, the collar is externally provided with a hexagonal wrench-gripping surface 20 and otherwise may have any desired external shape so long as the wall thickness is sufficient to give it the necessary strength. The internal bore of the collar is of such dimension relative to the hose on which it is to be used that it will fit snugly thereon, preferably with a slight compression of the hose. For example, the collar for hose having an outer diameter of 3/8 (.375) of an inch may have a bore of .368 inch. At one end the bore is flared as at 21 so as to prevent injury to the hose when the hose is flexed and to facilitate forcing the collar over the hose end. The other end of the bore is threaded preferably for about half its length, with a tapered pipe-thread 22 adapted to screw on the threads of the portion 15 of the coupling part. The collar may also be longitudinally broached so as to provide a plurality of grooves 24, there being four such grooves in the embodiment shown. A greater or lesser number may be used if desired. The purpose of these grooves is to restrain rotation of the collar on the hose, which is accomplished by reason of the fact that the hose substance is squeezed into them when the hose is expanded by insertion of the threaded shank 17, as hereinafter described.

Referring to Fig. 4, a modified form of coupling part is shown which is like that of Fig. 1 except that the short cylindrical portion 16 is omitted and the shank 17 is formed with its larger end substantially abutting the threaded portion 15.

A further modification of the coupling part is shown in Fig. 5 in which the threaded portion 15 has been omitted so that the short cylindrical portion 16 abuts the surface 14. With this form of coupling part, the threads 22 of the collar serve only to grip the hose more firmly and the technique of assembling the fitting on a hose is somewhat different from that used where the coupling part is provided with a threaded portion 15, as will be described later.

Referring to Fig. 4, the fitting is assembled on the end of a hose 30 in the following manner: The collar is pushed on to the hose end, the hose entering the flare 21. Upon engagement of the hose with the first of the threads 22, the collar is rotated, the threads serving to draw the collar onto the hose, and the collar is thus screwed on until the hose end 31 is a short distance from the end 32 of the collar, leaving one or two of the threads 22 exposed. The threaded shank 17 is then pushed into the open end of the hose sufficiently to engage the thread 19 with the hose lining 33 and is rotated while the collar and hose are held stationary, or vice versa. Preferably some lubricant is applied to the shank or to the inside of the hose before this operation. The threads 19 grip the lining 33 of the hose and draw the shank inwardly as it is rotated relative to the hose. As the shank progresses through the collar it expands the hose radially, compressing it against the collar. Where the grooves 24 are used, the hose substance is forced into them by the expanding action of the tapered shank, as shown at 34 in Fig. 5, and rotation of the hose in the collar is thus prevented. When the shank is nearly all the way into the hose, the threads 22 engage the threads on the portion 15 and the last few turns of the coupling part relative to the collar will draw these parts together until the end 32 of the collar abuts the face 14 of the coupling part. The hose having been positioned in the collar as described above, the screwing of the portion 15 into the collar will effect a further compression of the end of the hose in a longitudinal direction and increase the sealing effect, especially because the compression of the end of the hose crowds it into the recess surrounding the cylindrical section 16 of reduced diameter, behind the shoulder forming the outer end of that recess. The abutting of the collar against the face 14 prevents the parts being rotated so far as to cause the threads 19 to damage the lining 33.

Referring to Fig. 5, the modified form of fitting there shown is assembled in the manner described in connection with Fig. 4 except that the hose is initially inserted fully in the collar so that its end 31 is flush with the end 32 of the collar. When the shank 17 is fully inserted in the hose, so that the collar abuts the surface 14 of the coupling part, the hose expands slightly behind the larger end of the shank in that portion which surrounds the cylindrical portion 16. This expansion behind the shoulder of the shank 17 effects a further locking action resisting tensile strain on the hose tending to pull it out of the fitting. Since the shoulder is annular it also presents resistance to the unscrewing of the shank from the hose. This fitting is entirely adequate to secure the hose and is somewhat less expensive to manufacture but is less desirable than the forms shown in Figs. 1 and 4 in that care must be taken not to rotate the parts of the fitting relative to one another after they have been brought into abutting relationship, as to do so is liable to damage the hose lining and weaken its union with the fitting.

It will be observed that no special tools are required to assemble this fitting on a hose as a pair of ordinary wrenches or a single wrench and a vise are sufficient to effect relative rotation between the fitting parts. The entering edge 18 of the shank 17 is small enough to be easily started in a hose with such pressure as can be applied manually. It has been found in practice that the fittings above described hold the hose so securely as to be proof against leakage or blowing off at pressures which burst the hose. For example a hose of 3/8 inch outer diameter and 3/16 inch inner diameter was equipped with a fitting in which the collar had a bore of .368 inch, the shank had a minimum diameter of .213 inch and a maximum diameter including the thread of .285 inch, the depth of the thread being approximately .015 inch. The hose burst at a pressure of 3000 pounds per square inch, up to which pressure there was no leakage at the fitting.

It will be observed that in assembling the various forms of fitting described no part of it is deformed and consequently it may be removed from a worn or damaged hose and reused on a new hose with the same effectiveness as a new fitting.

What is claimed is:

In combination with the end of a hose having a compressible wall with resilient and distortable inner and outer surfaces, a quick-attachable reusable fitting comprising, a collar having a wrench-receiving portion and a cylindrical bore fitting tightly throughout substantially all of its length on the outer surface of said hose in its normal unexpanded condition, said bore being threaded from one end throughout a substantial portion of its hose contacting surface, a coupling part having a threaded section adapted to screw into the threaded end of said bore, a shank extending outwardly from and of less diameter than said threaded section and having a smooth cylindrical portion adjacent thereto terminating in an annular upstanding shoulder, said shank being tapered outwardly from said shoulder to its end and provided on its tapered portion with a spiral thread, said hose end being progressively compressed between said tapered portion of the shank and said collar and gripped from both sides between the threads on said collar and the threads on said shank and being compressed behind said shoulder and into the space around said cylindrical portion of said shank by the confinement of said collar and the endwise compression of the threaded section of said coupling part.

WALLACE MacWILLIAM.

REFERENCES CITED

The following references are of record in the file of this patent:

UNITED STATES PATENTS

| Number | Name | Date |
|---|---|---|
| 1,266,416 | Davis | May 14, 1918 |
| 1,994,784 | Porzel | Mar. 19, 1935 |
| 2,360,761 | Clickner | Oct. 17, 1944 |
| 2,399,791 | Conroy | May 7, 1946 |

FOREIGN PATENTS

| Number | Country | Date |
|---|---|---|
| 57,604 | Switzerland | Oct. 12, 1911 |
| 769,176 | France | June 5, 1934 |